United States Patent
Karmakar et al.

(10) Patent No.: US 11,458,622 B2
(45) Date of Patent: Oct. 4, 2022

(54) SYSTEM USING NATURAL CONVERSATION FOR MONITORING A FACILITY

(71) Applicant: Honeywell International Inc., Morris Plains, NJ (US)

(72) Inventors: Sheeladitya Karmakar, Bangalore (IN); Prabhat Ranjan, Bangalore (IN); Rajat Saha, Bangalore (IN); Jegathesan Shennakesavan, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 823 days.

(21) Appl. No.: 16/362,853

(22) Filed: Mar. 25, 2019

(65) Prior Publication Data
US 2020/0306958 A1    Oct. 1, 2020

(51) Int. Cl.
*B25J 9/16* (2006.01)
*G06F 9/54* (2006.01)
*G05B 15/02* (2006.01)

(52) U.S. Cl.
CPC ........ *B25J 9/163* (2013.01); *B25J 9/161* (2013.01); *G05B 15/02* (2013.01); *G06F 9/547* (2013.01)

(58) Field of Classification Search
CPC .......... B25J 9/163; B25J 9/161; G05B 15/02; G05B 2219/2642; G06F 9/547
See application file for complete search history.

(56) References Cited

U.S. PATENT DOCUMENTS

| | | | | |
|---|---|---|---|---|
| 9,230,560 | B2* | 1/2016 | Ehsani | G10L 15/22 |
| 9,807,236 | B2* | 10/2017 | Williams | H04M 3/5191 |
| 11,113,608 | B2* | 9/2021 | Salameh | G06F 9/54 |
| 11,227,309 | B2* | 1/2022 | Yan | G06Q 30/0251 |
| 11,234,646 | B2* | 2/2022 | Cha | A61B 5/6823 |
| 2015/0309483 | A1* | 10/2015 | Lyman | H04L 12/2829 700/275 |
| 2016/0021038 | A1* | 1/2016 | Woo | H04L 67/141 709/206 |
| 2018/0183860 | A1* | 6/2018 | Majumdar | H04L 12/66 |
| 2018/0324120 | A1* | 11/2018 | Smullen | H04L 51/02 |
| 2020/0120155 | A1* | 4/2020 | Majumdar | H04L 67/42 |
| 2020/0233436 | A1* | 7/2020 | Fox | B60W 60/001 |

(Continued)

OTHER PUBLICATIONS

Kar et al., "Applying Chatbots to the Internet of Things: Opportunities and Architectural Elements," VIT University—School of Computing Sciences and Engineering, 9 pages, accessed on Jul. 15, 2019.

(Continued)

*Primary Examiner* — Ramesh B Patel
(74) *Attorney, Agent, or Firm* — Seager, Tufte & Wickhem LLP

(57) ABSTRACT

A self-guided robot (bot) mechanism. An example bot may have a channel having an input for users, a cloud platform connected to the channel, a bot framework connected to the cloud platform, a web services module connected to the bot framework, and one or more drivers connected to the web services module. The one, the bot framework, the web services module and the drivers may be electronic hardware devices that effect their respective functions with a level of software managed and manipulated by the devices according to their respective algorithms.

20 Claims, 11 Drawing Sheets

(56) References Cited

U.S. PATENT DOCUMENTS

2020/0348662 A1* 11/2020 Cella .................. H04W 52/246
2021/0157312 A1* 5/2021 Cella ........................ G06N 5/04

OTHER PUBLICATIONS

Baby et al., "Home Automation Using IoT and a Chatbot Using Natural Language Processing," International Conference on Innovations in Power and Advanced Computing Technologies, 6 pages, 2017.

* cited by examiner

SYSTEM USING NATURAL CONVERSATION FOR MONITORING A FACILITY

BACKGROUND

The present disclosure pertains to communication approaches relative to monitoring facilities.

SUMMARY

A channel having an input for users, a cloud platform connected to the channel, a bot framework connected to the cloud platform, a web services module connected to the bot framework, and one or more drivers connected to the web services module. The one, the bot framework, the web services module and the drivers may be electronic hardware devices that effect their respective functions with a level of software managed and manipulated by the devices according to their respective algorithms.

DESCRIPTION

Figure 1:
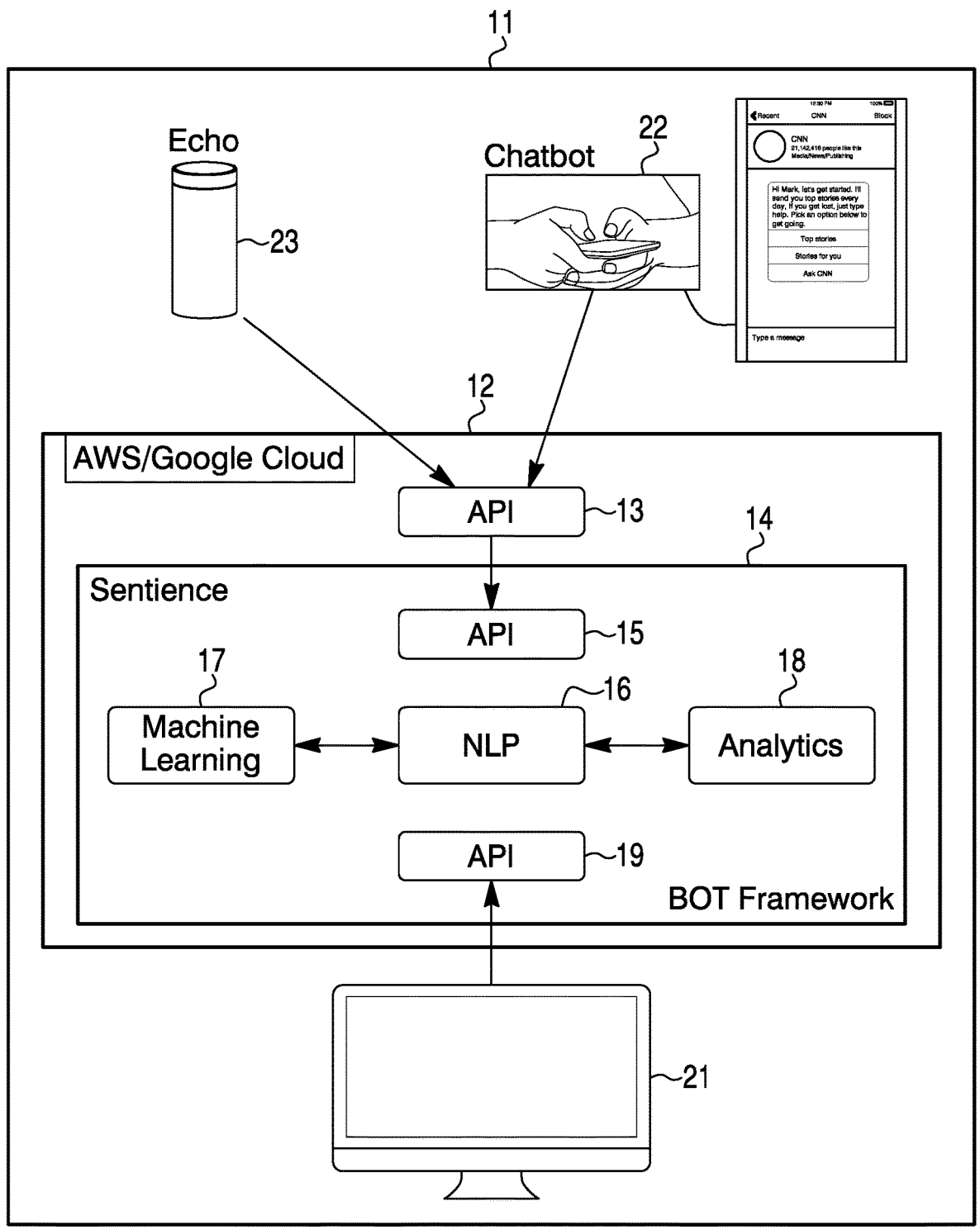
FIG. 1 is a diagram of a system that may aid in effecting a bots technology strategy.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

A facility manager of a building today may manage a building using an existing BMS (building maintenance system) which has several screens showing different items of information linked to devices and controllers in the building. However, this process may require intensive training to understand how a BMS system works (with different dashboards, screens to navigate, and so forth). A building owner may have to spend out-of-pocket money to train the people on the system. This may involve many operational costs. A high attrition rate in operational staffs among buildings, may be one of the biggest cost pain points. So, in a nutshell, the issues that one may solve are the following items. One item is an intensive training need and dependency on skilled labors for operations. Another item is a need to maintain/fix a product more easily and quickly. Different systems may be bridged for maintenance easily. There may be an app overkill for easy and minimal interaction with products and solutions. An issue may be a lack of using interaction data with building systems today for any analytics and recommendations/insights which are immediately valuable for facility managers and building operators or owners.

A company may be investing for the following reasons. One may be to get a large existing installation base as a BMS service provider. Another is data collection services being initiated (e.g., sentience data lake).

The present system and solution may result in the following advantages, which may include cost reduction (e.g., reduced manual effort), reduction of app overload, real time relevant data, and scalability of a solution that may be enhanced for handling multi-site enterprise scenarios.

A main value proposition of the solution lies in obtaining faster information about buildings/homes that a company can capture (e.g., interaction data), reduced downtime and more efficient facility maintenance, and control in the hands of the users (such as improving comfort, safety and security).

The business value may be assessed on the following fronts. A value proposition for recurring revenue based on a number of messages, and basic, intermediate, advanced features to be validated for using conversation as a service (CaaS).

Some things to note may be what percent of costs can be saved for buildings by reducing/eliminating training costs, what percentage of costs can be saved by reduced downtime and more efficient facility management such as placing service requests seamlessly through a bot. "Bot" may be a common nickname for a software robot, which may be an automated tool that carries out repetitive and mundane tasks. A value added feature may be to remove an app overkill and provide conversation as a service through a single interface.

One may develop a re-usable voice- and chat-based engine leveraging a bot framework that can interact with all supervisory systems of buildings and homes of today. The engine may consist of channels, a knowledge module and a cognitive analytics module.

Machine learning and skills/intents may be used to predict behavior of stakeholders when they interact with buildings/homes Specific use cases may be as in the following. A user may talk via a bot to the specific building that he/she is in charge of, once arriving in the morning. For example, one may ask about the status of the building, without learning specific scripts/commands. Multiple users may get support (e.g., facility managers, building operator, and owner) in a group conversation with the building bot. A user may ask for basic data about the building like critical alarms and reports on demand.

A bots execution strategy may be noted. FIG. 1 is a diagram of a system 11 that may aid in effecting the bots technology strategy. It may have an AWS (Amazon™ Web Service Google™ cloud, or an advanced wireless service) 12, which in turn may include an API (application programming interface) 13 connected to a sentience module 14, which may be a bot framework. API 13 may be connected to an API 15 of sentinence module 14. Sentinence module 14 may also have an NLP (natural language processing) module 16. A machine learning module 17 may be connected to natural language processing module 16. An analytics module 18 may be connected to NLP module 16. An API 19 may be connected to a graphical interface outside of AWS 12. From outside of AWS 12 may be a connection from chatbot 22 and an echo 23.

There may be many different types of APIs for operating systems, applications or websites. NLP may be a subfield of computer science, information engineering, and artificial intelligence concerned with the interactions between computers and human (natural) languages, in particular how to program computers to process and analyze large amounts of natural language data. REST may stand for representational state transfer. It may rely on stateless, client-server, cacheable communications. In many cases, it may be used with the HTTP protocol.

A sentience module 14 may address a key set of issues in the information-rich world, namely, managing a flood of information that people deal with, and, in parallel, providing the enterprise with an agile solution for managing unstructured data. Echo™ may be a technology that deals with business process automation (BPA) by managing information, data and processes to reduce costs, and manage resources and investments. A chatbot (also known as a smartbots, talkbot, chatterbot, bot, IM bot, interactive agent, conversational interface, or artificial conversational entity) may be a computer program or artificial intelligence which conducts a conversation via auditory or textual approaches.

A reusable voice- and chat-based engine may leverage a bot framework that can interact with virtually all supervisory systems of buildings and homes of today.

Bot frameworks may be used to execute the first two use cases and validate them with existing customers having a collaboration/notification bot (maintenance related), e.g., Avaamo™.

A room control bot (use related) may be used with a company bot framework. One may work with a sentience to deploy a room control bot in a sentience cloud (a service consumed by virtually all brands) as part of a connected buildings roadmap. Machine learning and skills/intents may be used to predict behavior of stakeholders when they interact with buildings/homes.

A business and deployment strategy may involve the following items. There may be a focus on installation, maintenance and use; related cases for deployment; evaluation economics of using the bot framework vs using a third party bot framework; a cost of hosting, data acquisition and retention, and analytics; and so on.

Also work may be done with product marketing across the Americas and EMEA to deploy pilots at existing NLI sites and evaluate value proposition (WTP) plus customer feedback on user experience (UX).

There should be potential pilots for room control bot (use related), and a mock up villa in META (Middle East, Turkey and Africa) for an IHA (independent health association) NPI (national provider identifier) first deployment.

There may be potential pilots for a notification/collaboration bot, such as IoT for retail (a pilot at lifetime fitness), and a common supervisor/connect2service (a pilot at trend energy bureau).

There may be a value proposition for recurring revenue (based on a number of messages, features, that are basic, intermediate, advanced) to be validated for using conversation as a service (CaaS). Things that may be noted are what percentage of costs can be saved for buildings by reducing/eliminating training costs, and what percentage of costs can be saved by reduced downtime and more efficient facility management, thus placing service requests seamlessly through bots. A value added feature may be to remove app overkill and provide conversation as a service through a single interface.

A voice and chat bot may be considered for interaction with buildings and homes. Issues may include intensive training that needs dependency on skilled labors for operations, seek to maintain and fix one's product more easily and quickly, and bridge different systems for maintenance easily. One may avoid app overkill and seek easy and minimal interaction with products and solutions, and not use interaction data with buildings/homes systems today for any analytics and recommendations.

A present approach may incorporate developing a reusable voice and chat based engine leveraging an existing bot framework that can interact with all supervisory systems of buildings and homes today. The approach may consist of channels, a knowledge module, and a cognitive analytics module. Machine learning and skills/intentions may be utilized to predict behavior of stakeholders when they interact with buildings and homes.

A value proposition may be supported by faster information about their buildings/homes that a company can capture (interaction data), reduced downtime and more efficient facility maintenance, and control in the hands of the users relative to enhancement of comfort, safety and security.

Key stakeholders (value chain) may be of maintenance with a system integrator/facility manager/facility operator, and use with home owners/building occupants.

A business model may include a bot on-demand model, a licensing framework/customized bot, and a subscription based model per message or messages/per API.

Bots may result in cost reduction (reduced manual effort), reduced app overload, better UX, real time data (relevant), and scalability of solution.

A company should have a large enough existing installation base as BMS service providers. Data collection services may be initiated (a sentience data lake).

Execution strategy may involve a use of bot frameworks to execute the first two use cases and validate them with existing customers, collaboration of bot (maintenance related), room control bot (use related), a pilot with existing NPIs Beta/Alpha customers (common sup/IoT for retail/IHA), and validate a target market and segment using market research data.

Figure 2:
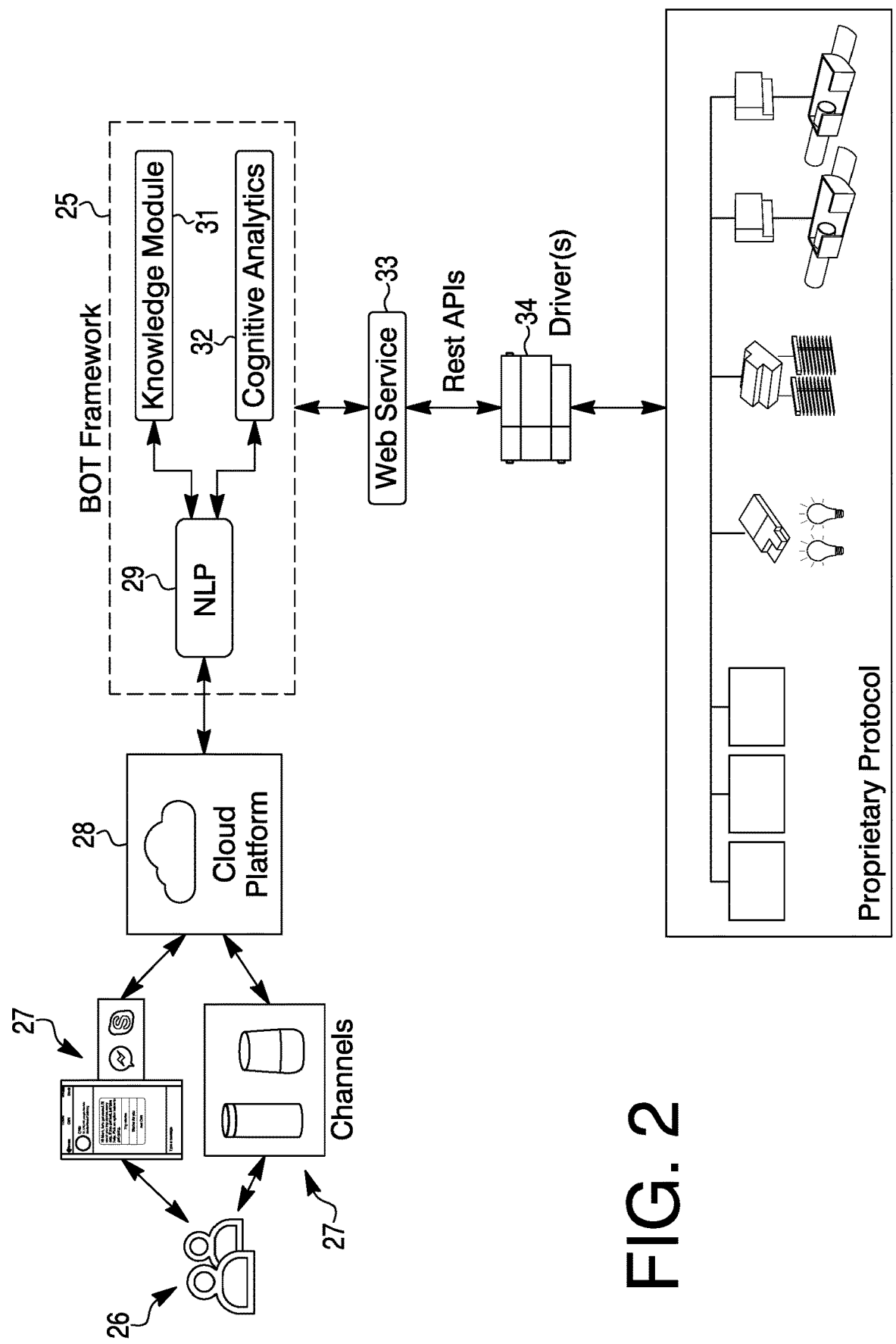
FIG. 2 is a diagram that may involve a use case of a room control bot.

A diagram of FIG. 2 may involve a use case no. 1 of a room control bot. An issue may include an app overkill where there is too much dependency on different apps for different operations, and interaction date capture in that people are capturing equipment data from homes today but not knowing how the users interact with the system. Use case details may incorporate where a user talks to a home either over voice or chats without having to learn specific commands. The user should be able to control the lights, HVAC and blinds through the above channels, and the user should be able to create and operate scenes/moods for rooms and homes.

Features (a first pass) that may be completed using a company bot framework include an HVAC for temperature control, light control for on/off and dimming, and IHA bot on Skype.

Figure 3:
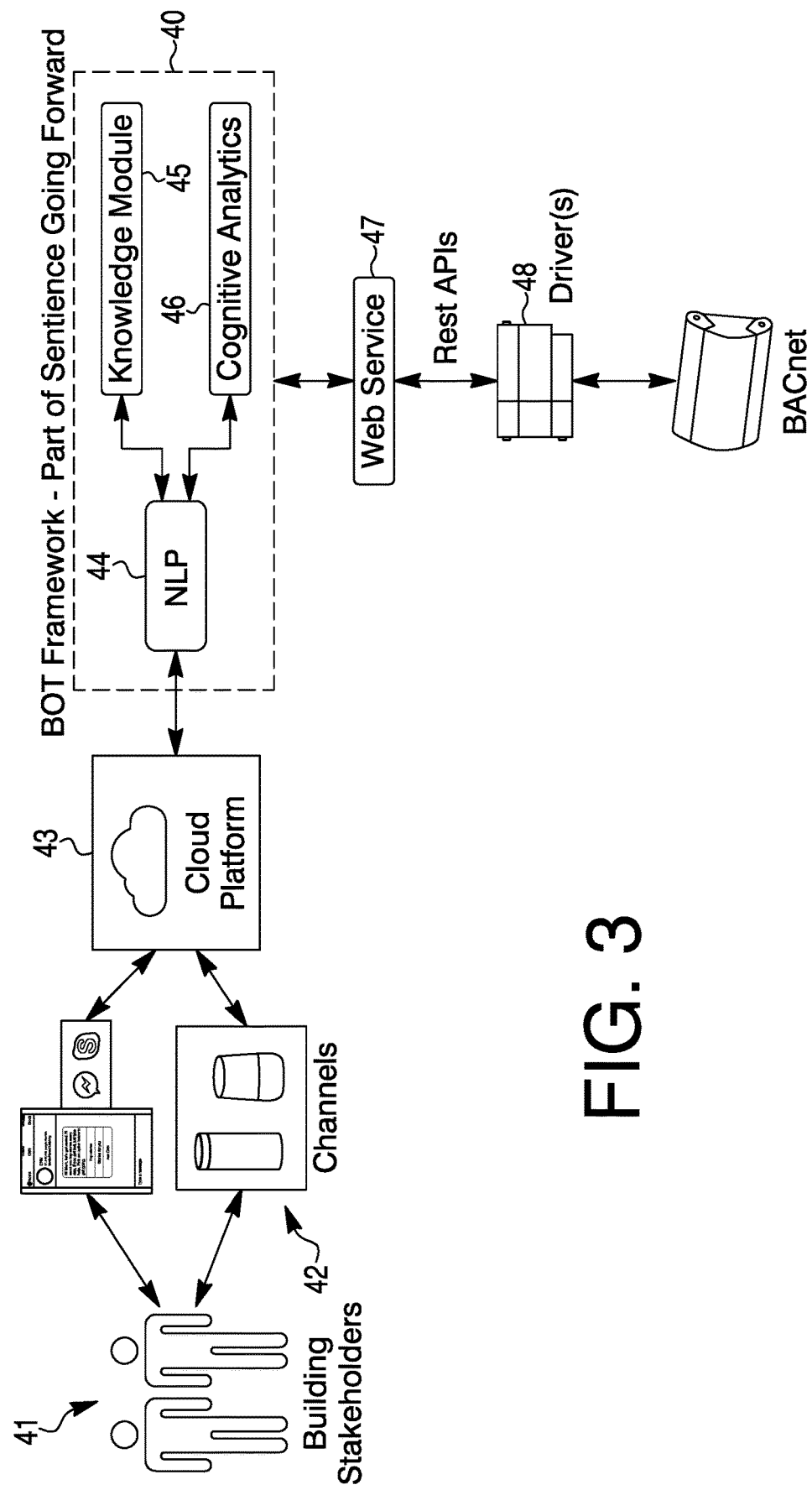
FIG. 3 is a diagram that may involve a use case of a collaboration bot.

FIG. 3 may involve a use case of a collaboration bot. Issues may include intensive training needs and dependencies on skilled labor for operations, interaction data capture in that one may be capturing equipment data from homes today but not know how the user interacts with the system. There may be an information overload in that relevancy of information (context based) is a big issue today (for example, alarming).

Use case details may include a user that talks "to" the specific building; he/she is in charge once the user comes in the morning with, e.g., a question of what is the status of my building, without learning specific scripts/commands. There may be multiple users support (e.g., facility manager, building operator, or owner) in a group conversation with the building bot. A user should be able to ask for basic data of the building like critical alarms and reports on demand.

Features (the first pass) may incorporate two way communications using a bot. The bot may initiate a conversation, for example, alarms/alerts. An Avaamo™ bot framework may be used. There may be a comparative analysis of frameworks, such as that of technology and economics. Features (a second pass) may incorporate multiple stakeholders on the same channel with the bot.

The diagram of FIG. 2 shows a bot framework 25. People 26 may have an interaction with various channels 27 of communication, such as an internet. These channels may be connected to a cloud platform 28. Cloud platform 28 may be connected to an NLP module 29 of bot framework 25. NLP module 29 may be connected to a knowledge module 31 and a cognitive analytics module 32. Bot framework 25 may be connected to a web service module 33. Web service module 33 may be connected to one or more drivers 34. REST APIs may be conveyed on the connection between web service 33 and drivers 34. Proprietary control may be in an output of drivers 34, to control lighting, curtains, room wall modules, and other components.

The diagram of FIG. 3 is of a bot framework 40. Building stakeholders 41 may communicate via various channels 47 with a cloud platform 43. An NLP module 44 of bot framework 40 may be connected with cloud platform 43. NLP module 44 may also be connected with knowledge module 45 and cognitive analytics module 46. Bot framework 40 may be connected to a web service module 47, which in turn may be connected to one or more drivers 48. REST APIs may be conveyed between web service 47 and drivers 48. Drivers 48 may be connected to such things as BACnet.

Figure 4:
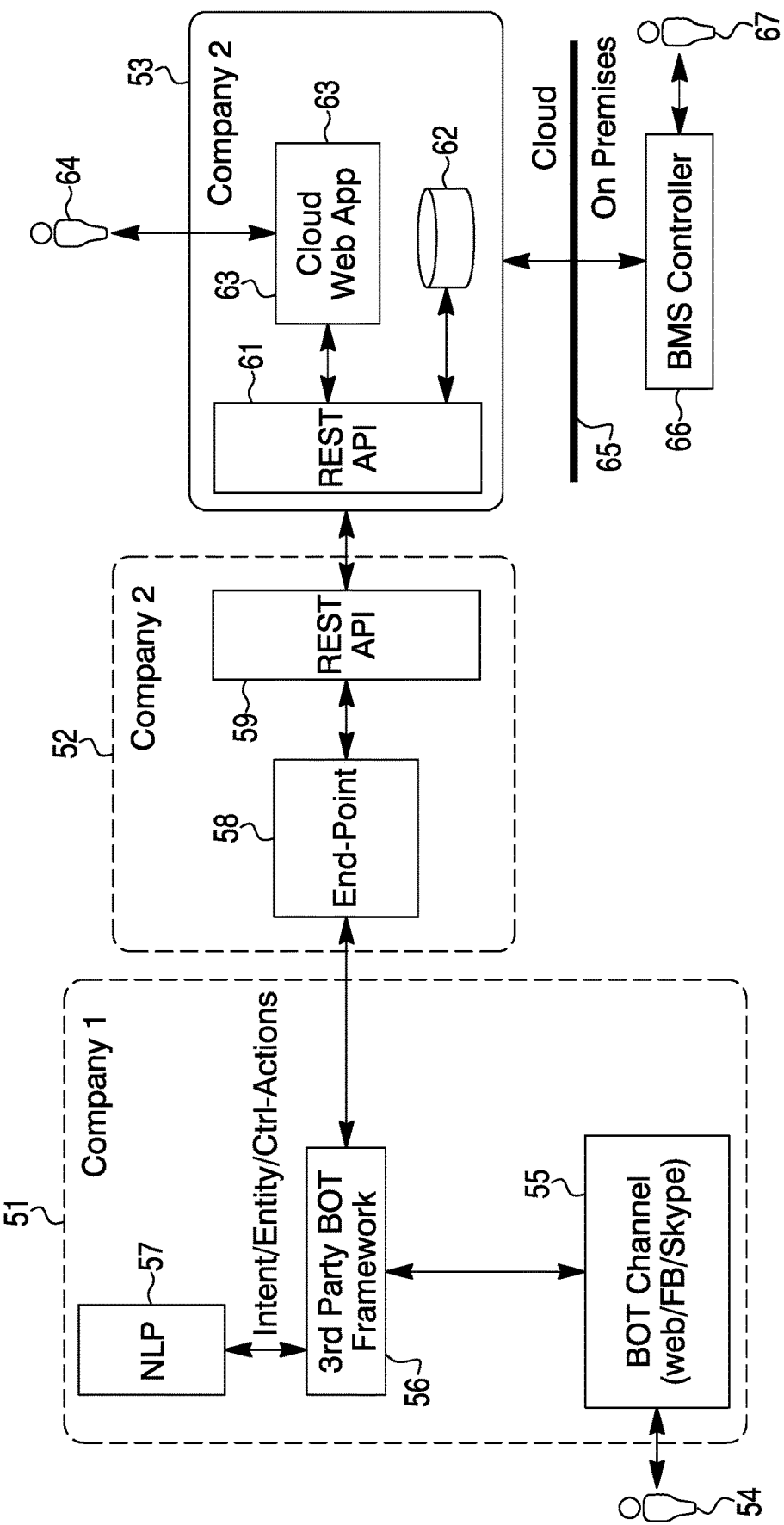
FIG. 4 is a diagram of an overview of a bot system relating to more than one company.

FIG. 4 is a diagram of an overview of a bot system relating to a company 1 and a company 2. Company 1 may have component 51 and company 2 may have components 52 and 53. Component 51 may have a user 54 that interacts with a bot channel (web/FB/Skype) 55. Channel 55 may be connected with a third party bot framework 56. An NLP module 57 may be connected to third party bot framework 56. An end point module 58 of component 52 may be connected with third party bot framework 56 of component 51. End-point module 58 may be connected with a REST API module 59 of component 52. REST API module 59 may be connected with a REST API 61 of component 53. REST API 61 may be connected to a data storage unit 62 and a cloud web app module 63 of component 53. A user 64 may interact with cloud web app module 63. Component 53 may be connected via a cloud 65 with a BMS controller 66. A user 67 may interact with BMS controller 66.

Figure 5:
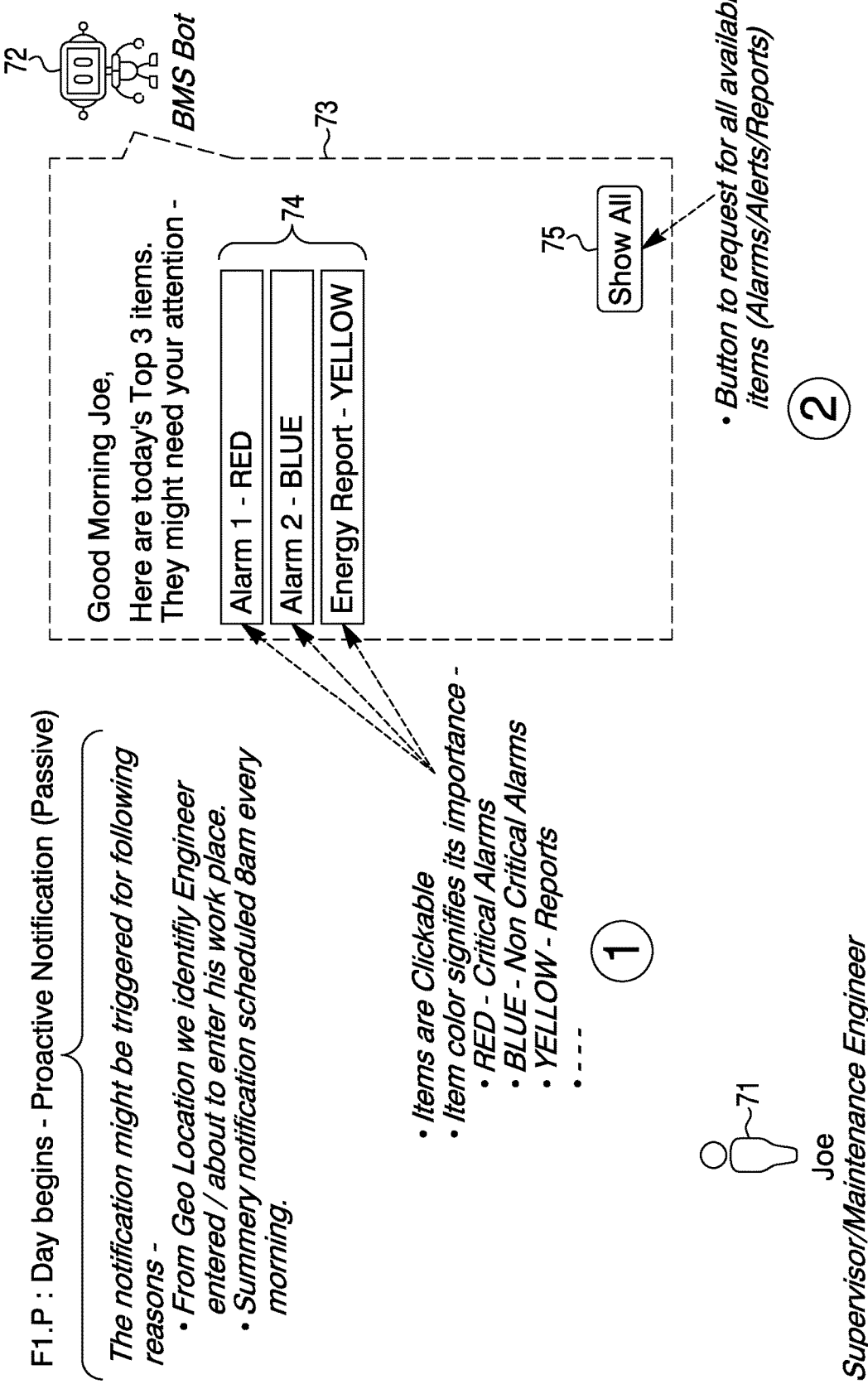
FIG. 5 is a diagram of bot activity involving a user.

FIG. 5 is a diagram of activity involving a user 71, who may be regarded as "Joe", a supervisor/maintenance engineer. A day may begin with a proactive notification (passive). The notification may be triggered for several reasons. One reason is from a geo location, in that one may identify an engineer who has entered or is about to enter a work place. Another reason is that a summary notification may be scheduled at 8:00 AM every morning. A BMS bot 72 may say in a message 73, as text, voice or another way, "Good morning Joe, Here are today's top three items. They might need your attention." The three items may be graphically displayed in boxes 74 indicating Alarm 1—RED, Alarm 2—BLUE and Energy Report—YELLOW. The items are clickable. The item color signifies importance. Red is for critical alarms, blue is for noncritical alarms, and yellow is for reports. Other colors may be used. Each step of the approach shown in FIG. 5 may be indicated with a number within a circle. Noticing items 74 is a first step. There may be a button 75 which can be pressed to request all available items, such as alarms, alerts and reports. Pressing button 75 or considering whether to press it may be a second step.

Figure 6:
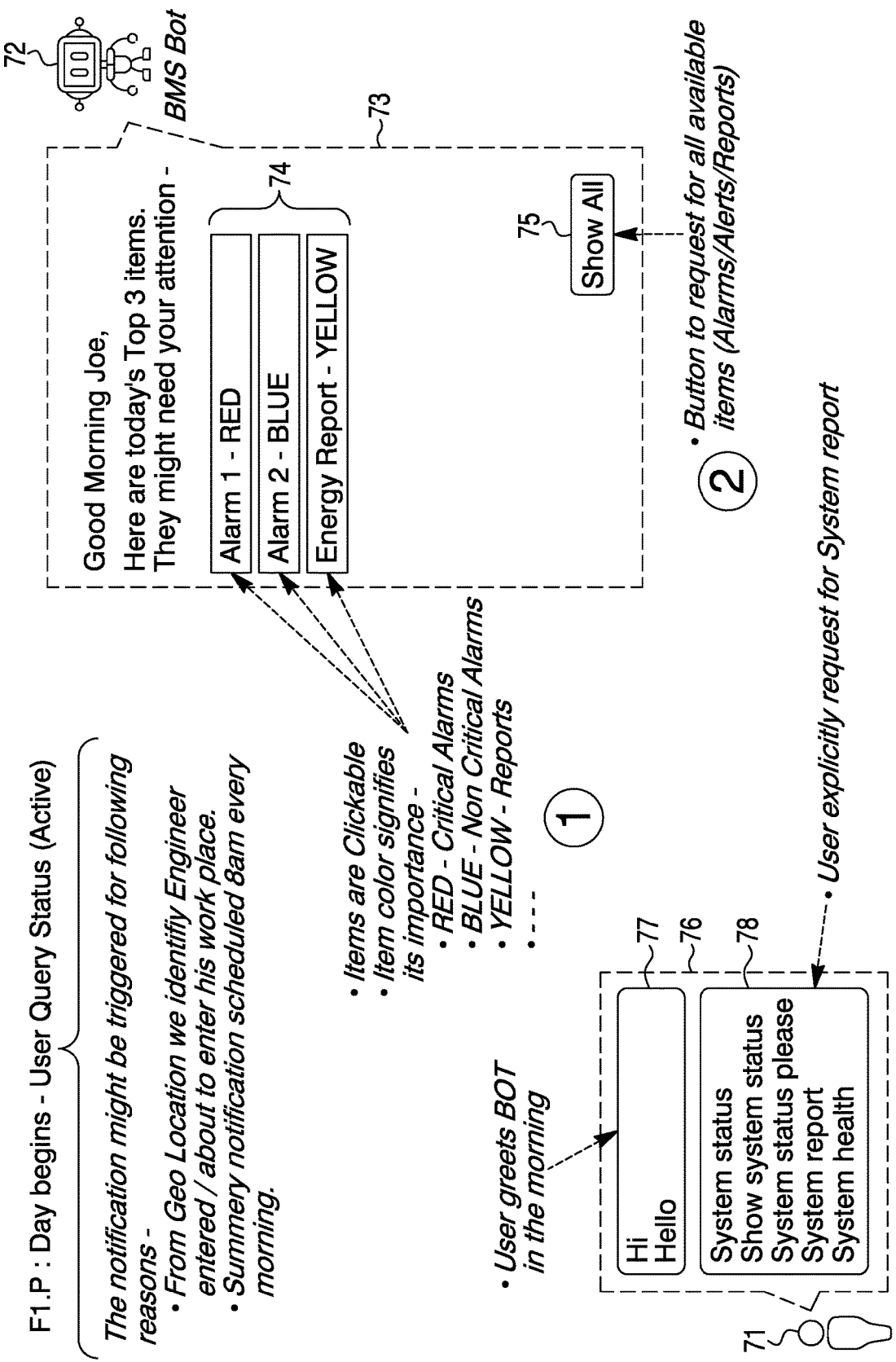
FIG. 6 is diagram that pertains to a day beginning with a user query status indicated as active.

FIG. 6 is diagram like that of FIG. 5. It pertains to a day beginning with a user query status indicated as active. User 71 may greet bot 72 in the morning as shown in block 77 of a message 76. User 71 may explicitly request a system report as shown in block 78 of message 76.

Figure 7:
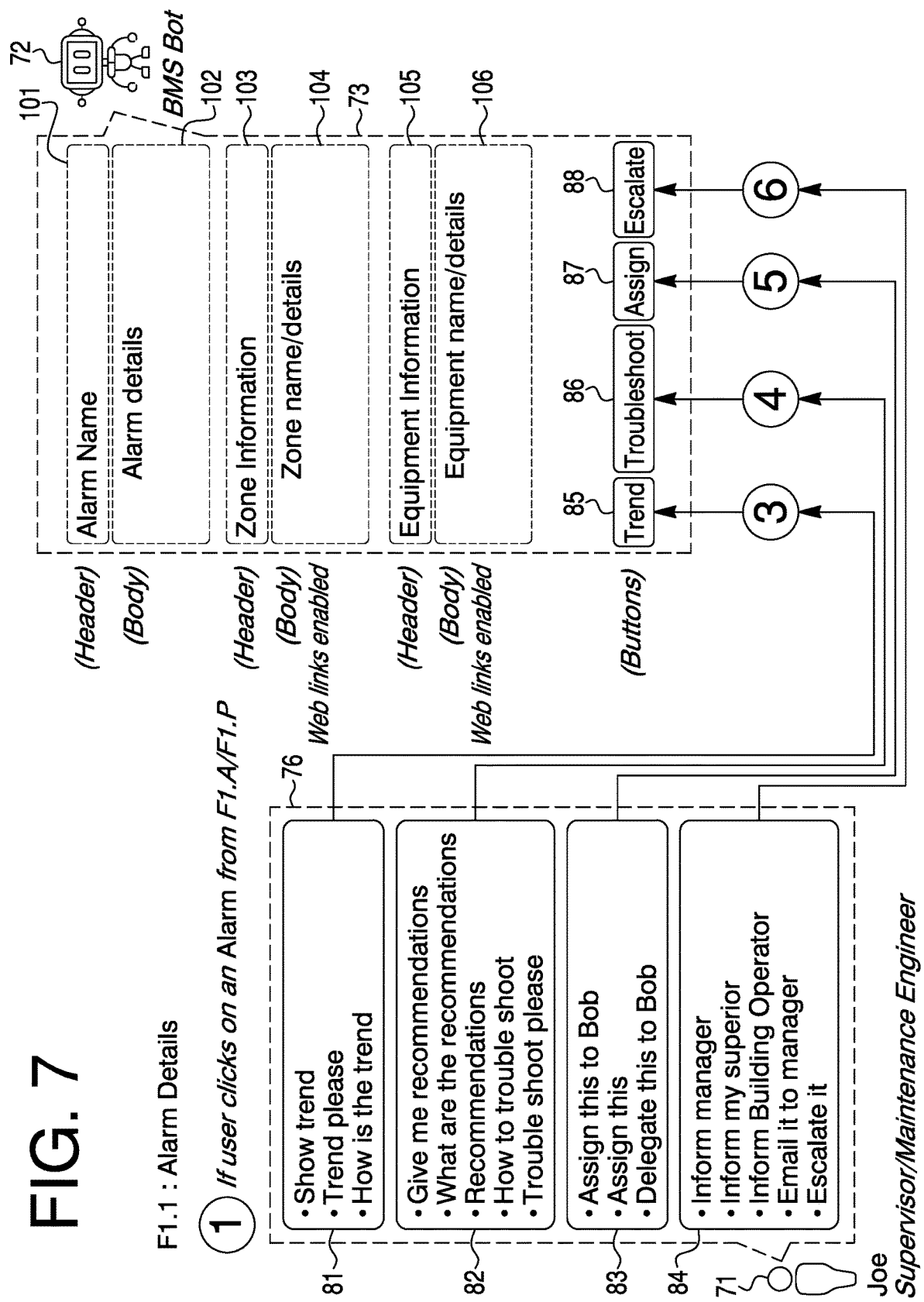
FIG. 7 is a diagram pertaining to alarm details.

FIG. 7 is a diagram pertaining to alarm details. User 71 may click on an alarm as a first step in FIG. 5. As a second step, a request in a block 81 of message 76 by user 71 may be for a showing of a trend and information related to the trend. A third step may indicate activation of a trend button 85 in message 73 of BMS bot 72. A request in block 82 may ask for recommendations, trouble shooting and possibly related information. A fourth step may indicate activation of a troubleshoot button 86. A request in block 83 may be that an assignment of a topic at hand be made to some particular person. A fifth step may indicate activation of an assign button 87 in message 73. A request in a block 84 of message 76 may be that of a manager, supervisor, or building operator be informed, and/or that the request be escalated. A sixth step may indicate activation of an escalate button 88 in message 73.

Message 73, in FIG. 7, may list an alarm name, alarm details, zone information, zone name/details, equipment information and equipment name/details in areas 101, 102, 103, 104, 105, and 106, respectively.

Figure 8:
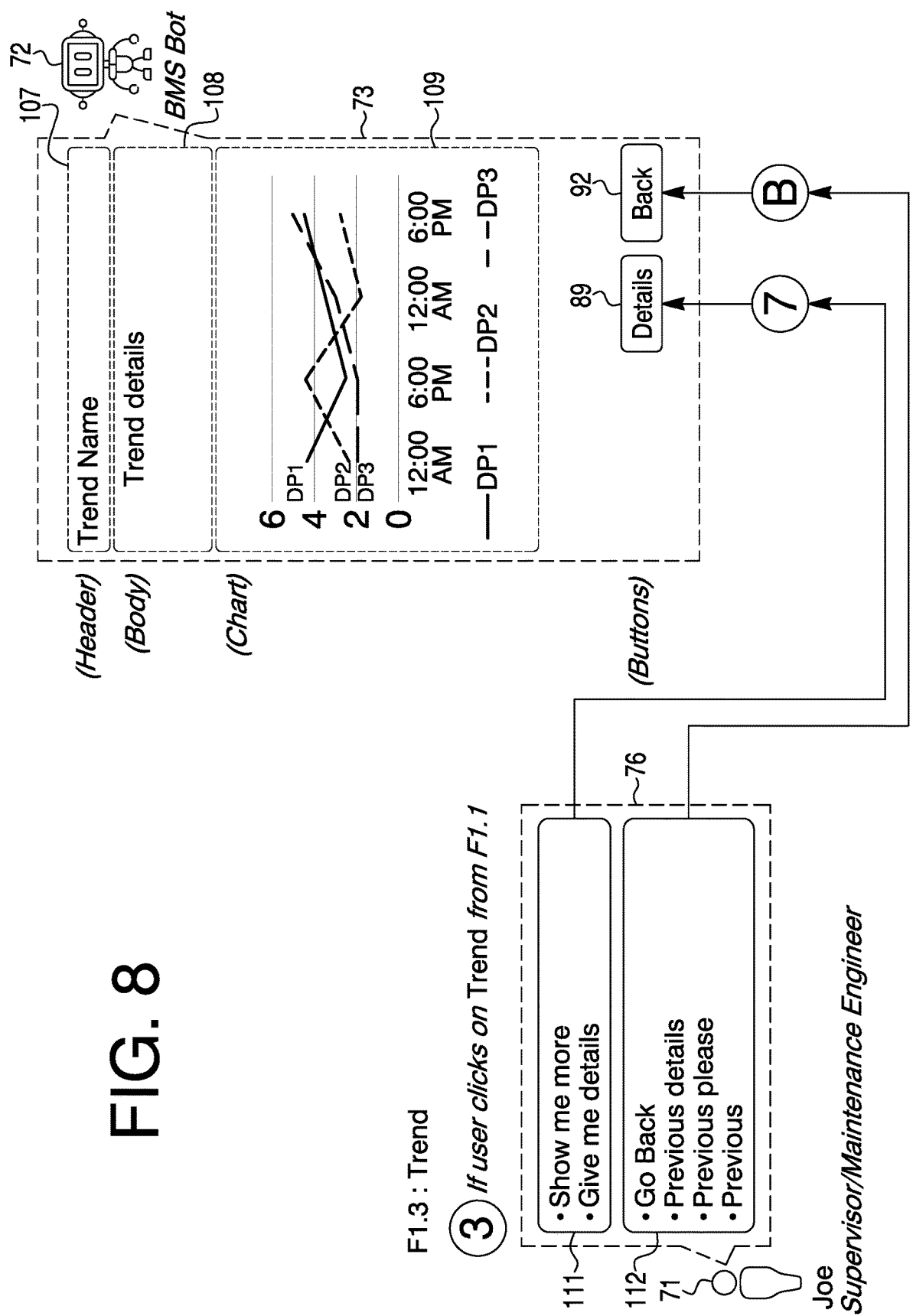
FIG. 8 is a diagram of what may happen if a user clicks on a trend button in the diagram of FIG. 7.

FIG. 8 is a diagram of what may happen if user 71 clicks on trend button 85 in the diagram of FIG. 7. BMS bot 72 may provide message 73 with a trend name, trend details and a chart of information in areas 107, 108 and 109, respectively. Block 111 of message 76 may be a request for trend details that can be effected with pressing a button 89 for details, as a seventh step. However, in block 112 of a message, one may request a go-back to previous details or information of the trend. This request may be a B (back) step that is effected with pressing a button 92 on message 73.

Figure 9:
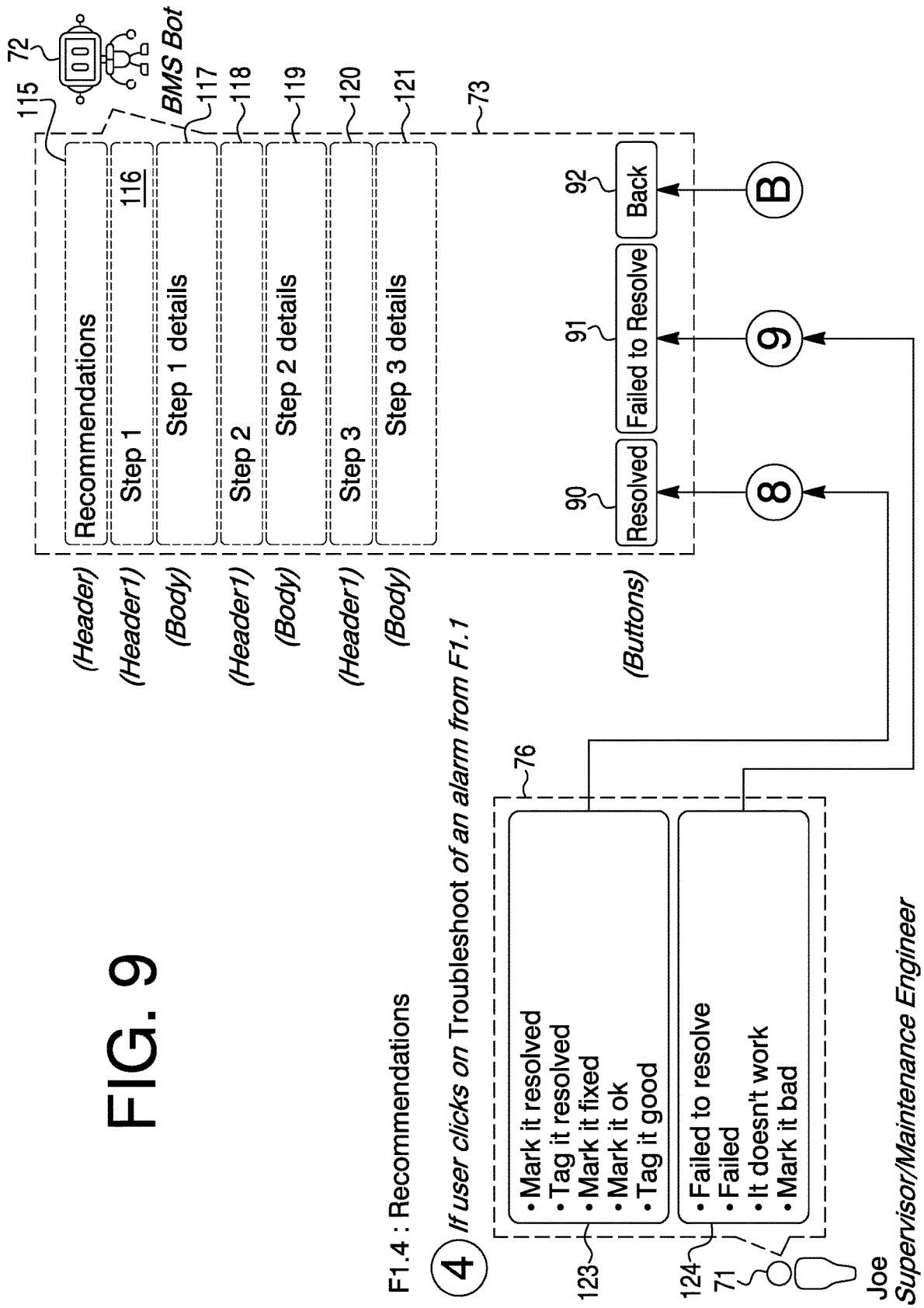
FIG. 9 is a diagram of what may happen if a user clicks on a trouble shoot button in the diagram of FIG. 7.

FIG. 9 is a diagram of what may happen if user 71 clicks on trouble shoot button 86 in a diagram of FIG. 7. BMS bot 72 may provide a message 73 with recommendations, step 1, step 1 details, step 2, step 2 details, step 3, step 3 details, and so on, in areas 115, 116, 117, 118, 119, 120 and 121, respectively, and so forth. Block 123 of message 76 may indicate such things as mark it resolved, tag it resolved, mark it fixed, mark it ok, tag it good, and/or so on. To effect the information in block 123, an eighth step to indicate resolution would be to press button 90. As to a block 124 of message 76, it may indicate failed to resolve, failed, it does not work, mark it bad, and/or so on. To effect the information in block 124, a ninth step would be to press button 91. However, to go back to previous details or information, the B (back step) button 92 may be pressed.

Figure 10:
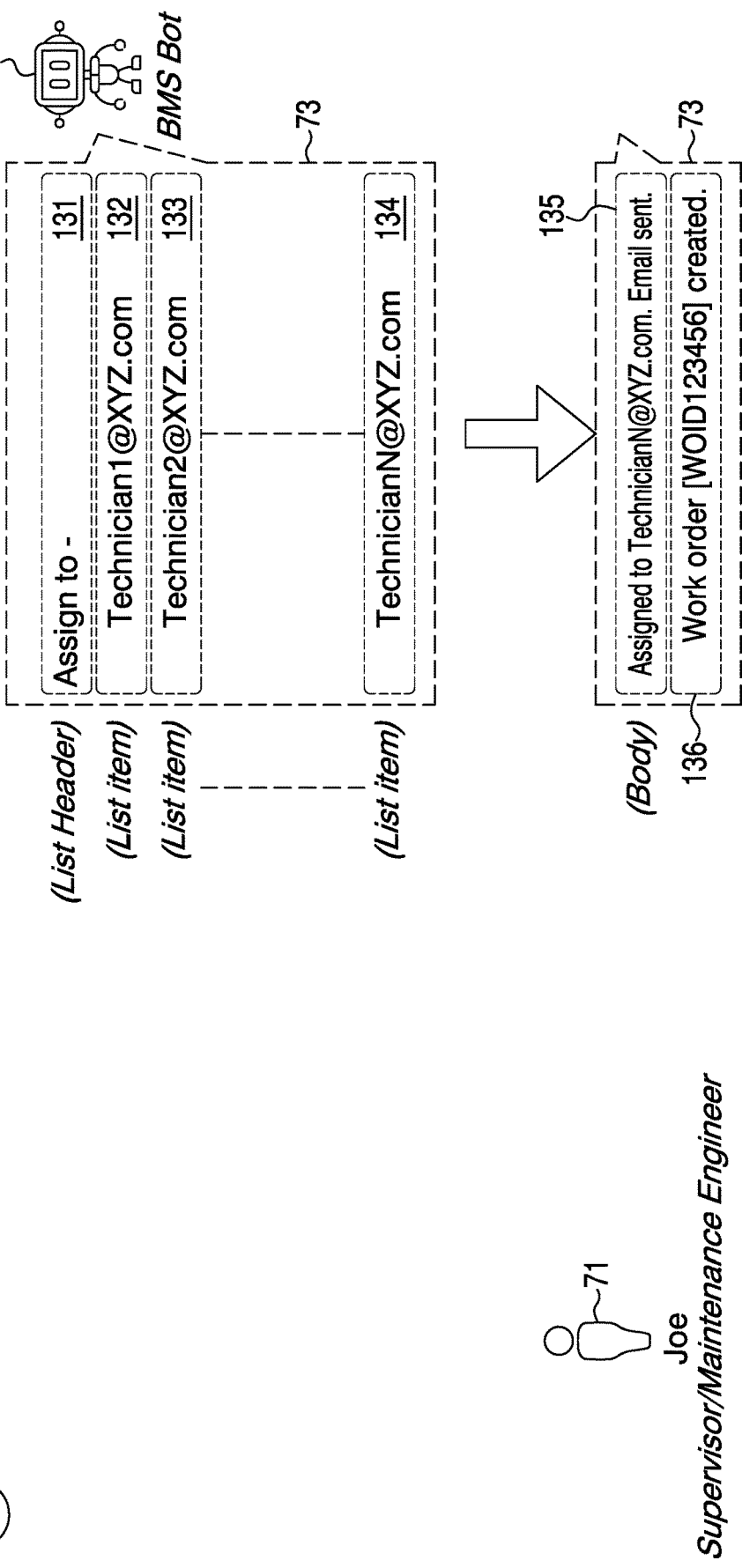
FIG. 10 is a diagram of what may happen if a user clicks on an assign button in the diagram of FIG. 7.

FIG. 10 is a diagram of what may happen if user 71 clicks on assign button 87 in the diagram of FIG. 7. BMS bot 72 may provide a message 73 with recommendations, such as assign to, "technician1@XYZ.com", "technician2@XYZ.com", or so on, to "technicianN@XYZ.com" in areas 131, 132, 133 and 134, respectively. Area 135 may indicate the assignment to "tecnician2@XYZ.com". Area 136 may indicate a work order created with an ID number.

Figure 11:
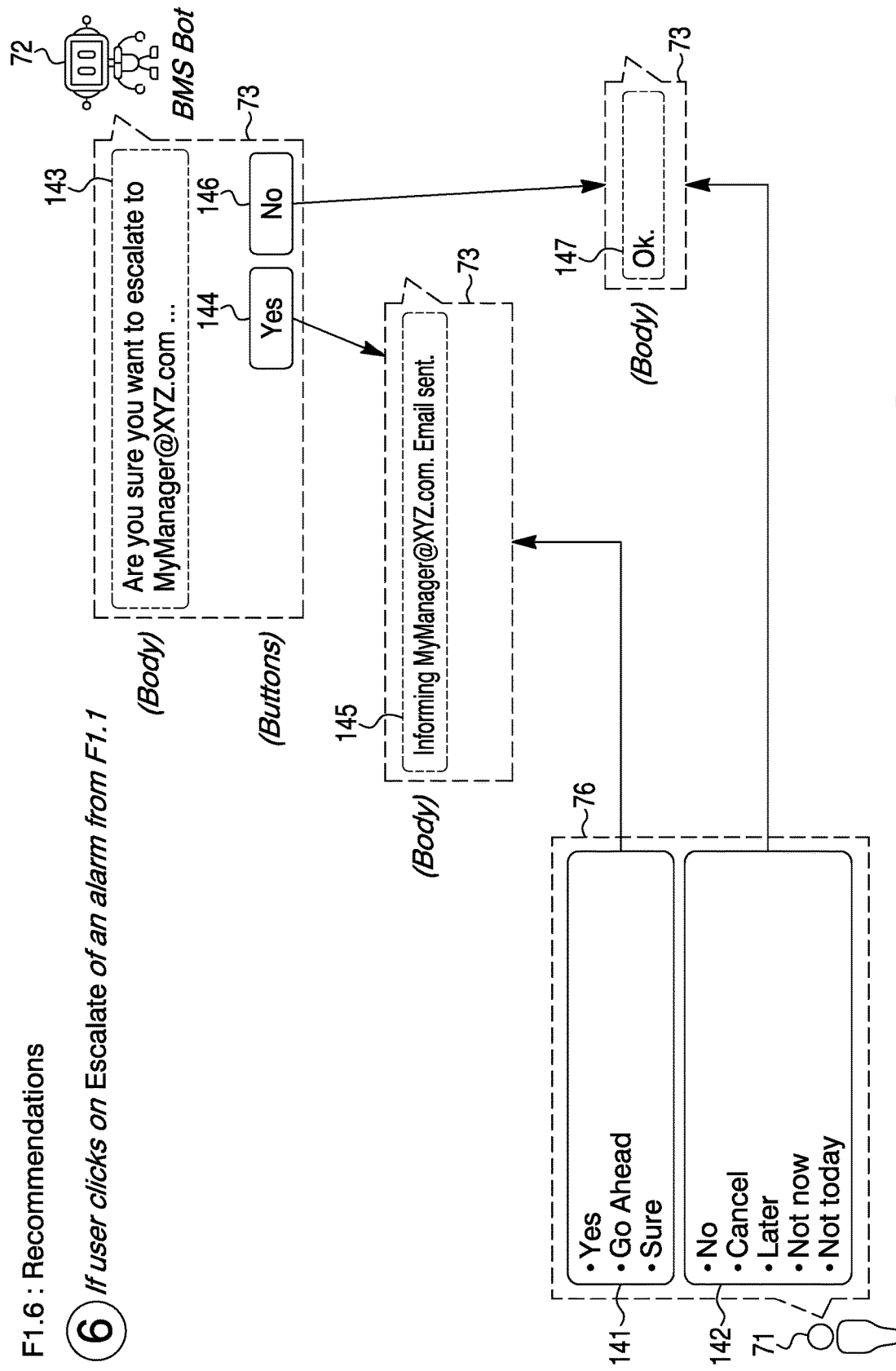
FIG. 11 is a diagram that indicates what may happen if a user clicks on an escalate button in the diagram of FIG. 7.

FIG. 11 is a diagram that indicates what may happen if user 71 clicks on escalate button 88 in the diagram of FIG. 7. Message 76 of user 71 may indicate in block 141, yes, to go ahead, sure, or the like, to a question in area 143 that asks whether you are sure you want to escalate to MyManager@XYZ.com. If yes, button 144 is pressed, then a manager is informed according to an area 145 of message 73. On the other hand, message 76 of user 71 may indicate in block 142 no, cancel, later, not now, not today, or so on, to the question in area 143. If a no button 146 is pressed, then an ok button 147 in message 73, may confirm not to escalate.

For an interaction, in the seventh step of a clicking by user 71 on button 89 in FIG. 8, about details of a trend, user 71 may open a details view link in a web browser.

There may be a software component. A stack level may be a cloud providing a secure, scalable infrastructure for collecting, aggregating and storing data, allowing connected "things" to communicate, and making an offering/SaaS solution available, IaaS/PaaS, and data lakes. The stack level may include consumption of domain specific, differentiated software enabled offerings and services delivered via a cloud or a private enterprise network.

A software type may be software enabled system, software incidental to the present solution, a system deployed using software or deployed manually (without the software) (e.g., a new process that uses a software control system). There may be an IoT (Internet of Things) component.

To recap, a software guided robot (bot) mechanism for performing automatic repetitive tasks, may incorporate one or more channels having an input for users or building stakeholders, a cloud platform connected to the one or more channels, a bot framework connected to the cloud platform, a web services module connected to the bot framework, and one or more drivers connected to the web services module. The one or more channels, the bot framework, the web services module and the drivers may be electronic devices that effect their respective functions with a level of software managed and manipulated by hardware of the electronic devices according to their respective algorithms.

The bot framework may incorporate a natural language processor connected to the cloud platform, a knowledge storage module connected to the natural language processor, and a cognitive analytics processor connected to the natural language processor.

The web service may be connected to one or more drivers.

One or more drivers may be connected to a network.

The network may use a BACnet protocol.

A bot system for one or more companies, may incorporate a first component having a user interface, a natural language processing module, a third party bot framework connected to the natural language processing module, and a bot channel connected to the user interface; a second component having an end point module connected to the third party bot framework, and a first representational state transfer application programming interface connected to the end point module; and a third component having a second representational state transfer application programming interface connected to the first representational state transfer application programming interface, a cloud web application connected to the second representational state transfer application programming interface, a storage module connected to the second representational state transfer application programming interface, and a second user interface connected to the cloud web application.

The cloud web application may be connected to a cloud.

The system may further incorporate a building management system controller connected to the cloud.

The system may further incorporate a third user interface connected to the building management system controller.

The first user interface, the second user interface or the third user interface may be for input of an inquiry about a building supervised by the building management system controller, and for an output in response to the inquiry.

Periodic reports at the first user interface, the second user interface or the third user interface may include critical alarms, non-critical alarms and reports about a building supervised by the building management system controller.

The first component may be associated with a first company, and the second and third components may be associated with a second company.

A system of natural language conversation may incorporate one or more channels, and a bot framework. The bot framework may incorporate a natural language processor connected to at least one of the one or more channels, a knowledge module connected to the natural language processor, a cognitive analytics module connected to the natural language processor, and a web services module connected to the bot framework.

The natural language processor, the knowledge module, the cognitive analytics module, and the web services module may be constructed from electronics hardware having a component of software managed by the electronics hardware to effect one or more functions of the respective module.

The web services module may be connected to the building management system. The one or more channels may be selected from a group incorporating an Echo™, chatbot, Google™ Alexa™, Siri™, and a cell phone.

The web services module may be connected to one or more drivers.

The one or more drivers may be connected to a network having a protocol, and the network may be connected to one or more devices selected from a group incorporating room temperature controls, lighting controls, curtain controls, door controls, and vent controls.

The one or more drivers may be connected to a building management system.

A user may ask a question and receive answer, via the one or more channels, the bot framework and/or the drivers, about a building supervised by the building management system.

U.S. patent application Ser. No. 15/877,929, filed Jan. 23, 2018, is hereby incorporated by reference.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A software guided robot (bot) mechanism for performing automatic repetitive tasks, comprising:
   one or more channels having an input for users or building stakeholders;
   a cloud platform connected to the one or more channels;
   a bot framework connected to the cloud platform;
   a web services module connected to the bot framework; and
   one or more drivers connected to the web services module; and
   wherein the one or more channels, the bot framework, the web services module and the drivers are electronic devices that effect their respective functions with a level of software managed and manipulated by hardware of the electronic devices according to their respective algorithms.

2. The mechanism of claim 1, wherein the bot framework comprises:
   a natural language processor connected to the cloud platform;
   a knowledge storage module connected to the natural language processor; and
   a cognitive analytics processor connected to the natural language processor.

3. The mechanism of claim 1, wherein the web service is connected to one or more drivers.

4. The mechanism of claim 3, wherein one or more drivers are connected to a network.

5. The mechanism of claim 4, wherein the network uses a BACnet protocol.

6. A bot system for one or more companies, comprising:
   a first component having a user interface, a natural language processing module, a third party bot framework connected to the natural language processing module, and a bot channel connected to the user interface;
   a second component having an end point module connected to the third party bot framework, and a first representational state transfer application programming interface connected to the end point module; and
   a third component having a second representational state transfer application programming interface connected to the first representational state transfer application programming interface, a cloud web application connected to the second representational state transfer application programming interface, a storage module connected to the second representational state transfer application programming interface, and a second user interface connected to the cloud web application.

7. The system of claim 6, wherein the cloud web application is connected to a cloud.

8. The system of claim 7, further comprising a building management system controller connected to the cloud.

9. The system of claim 8, further comprising a third user interface connected to the building management system controller.

10. The system of claim 9, wherein the first user interface, the second user interface or the third user interface is for input of an inquiry about a building supervised by the building management system controller, and for an output in response to the inquiry.

11. The system of claim 9, wherein periodic reports at the first user interface, the second user interface or the third user interface include critical alarms, non-critical alarms and reports about a building supervised by the building management system controller.

12. The system of claim 6, wherein:
   the first component is associated with a first company; and
   the second and third components are associated with a second company.

13. A system of natural language conversation comprising:
   one or more channels; and
   a bot framework; and
   wherein the bot framework comprises:
   a natural language processor connected to at least one of the one or more channels;
   a knowledge module connected to the natural language processor;
   a cognitive analytics module connected to the natural language processor; and
   a web services module connected to the bot framework.

14. The system of claim 13, wherein the natural language processor, the knowledge module, the cognitive analytics module, and the web services module are constructed from electronics hardware having a component of software managed by the electronics hardware to effect one or more functions of the respective module.

15. The system of claim 13, wherein the web services module is connected to the building management system.

16. The system of claim 13, wherein the one or more channels are selected from a group comprising an Echo™, chatbot, Google™ Alexa™, Siri™, and a cell phone.

17. The system of claim 14, wherein the web services module is connected to one or more drivers.

18. The system of claim 16, wherein:
   the one or more drivers are connected to a network having a protocol; and
   the network is connected to one or more devices selected from a group comprising room temperature controls, lighting controls, curtain controls, door controls, and vent controls.

19. The system of claim 17, wherein the one or more drivers are connected to a building management system.

20. The system of claim 19, wherein a user can ask a question and receive an answer, via the one or more channels, the bot framework and/or the drivers, about a building supervised by the building management system.

* * * * *